(12) United States Patent
Brewer

(10) Patent No.: US 12,326,376 B1
(45) Date of Patent: Jun. 10, 2025

(54) SPIKE ARRAYS FOR SMALL DISPLACEMENT FORCE MEASUREMENT

(71) Applicant: HRL Laboratories, LLC, Malibu, CA (US)

(72) Inventor: Peter Brewer, Westlake Village, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 302 days.

(21) Appl. No.: 18/086,161

(22) Filed: Dec. 21, 2022

(51) Int. Cl.
*G01L 1/00* (2006.01)
*G01L 1/26* (2006.01)

(52) U.S. Cl.
CPC ...................... *G01L 1/26* (2013.01)

(58) Field of Classification Search
CPC ..... G01L 1/26; G01R 1/06744; G01R 1/0675; G01R 1/0491; G01R 1/06761; G01R 1/06794; G01R 31/2887; G01R 31/2817; G01R 31/2858; G01R 31/2889; G01R 31/2891; G01R 31/31905; G01N 2203/0078–0082
See application file for complete search history.

(56) References Cited

U.S. PATENT DOCUMENTS

| | | | |
|---|---|---|---|
| 3,812,559 A | 5/1974 | Spindt | |
| 5,055,780 A | 10/1991 | Takagi | |
| 5,160,779 A | 11/1992 | Sugihara | |
| 5,326,428 A | 7/1994 | Farnworth | |
| 5,487,999 A * | 1/1996 | Farnworth | H01L 22/20 257/E23.07 |
| 5,585,736 A * | 12/1996 | Hshieh | G01R 1/067 324/754.04 |
| 6,026,677 A * | 2/2000 | Bonin | G01N 3/42 361/283.4 |
| 6,288,561 B1 * | 9/2001 | Leedy | H01L 21/67138 257/E23.06 |

(Continued)

FOREIGN PATENT DOCUMENTS

WO  2010-141264  12/2010

OTHER PUBLICATIONS

From U.S. Appl. No. 17/006,491 (now U.S. Pat. No. 11,555,830), Notice of Allowance mailed on Sep. 21, 2022.

(Continued)

*Primary Examiner* — Tran M. Tran
(74) *Attorney, Agent, or Firm* — Ladas & Parry, LLP

(57) ABSTRACT

A device and method for measuring the force generated by an expanding micro-actuator structure whose displacement is typically in the sub-micron range. Measurement of forces that occur at small displacements falls beyond the range of traditional load cell technology whose transducers require a minimum travel to record force changes. The force measurement of this invention uses spike arrays (nanometer tipped microstructure constructed of hard materials) together with a softer blank film that is imprinted by the array of spikes. The force may be determined by inverting the nano-indentation problem where the hardness (H) of the material is related to the applied force (F) of the nano-indenter by measuring the imprinted divot area (A) using the equation H=F/A. Alternatively, the force may be determined by comparing the imprinted pattern with known, standardized samples.

20 Claims, 6 Drawing Sheets

(56) References Cited

U.S. PATENT DOCUMENTS

| | | | |
|---|---|---|---|
| 6,296,171 B1 | 10/2001 | Hembree | |
| 6,512,387 B1* | 1/2003 | Bohn | G01R 31/70 324/762.02 |
| 6,891,387 B2* | 5/2005 | Leedy | H01L 23/5381 257/E23.06 |
| 7,019,835 B2* | 3/2006 | McMackin | G01N 21/8422 356/394 |
| 7,533,462 B2* | 5/2009 | Gleason | G01R 3/00 29/874 |
| 7,815,824 B2* | 10/2010 | Sreenivasan | B82Y 10/00 264/40.1 |
| 8,531,202 B2* | 9/2013 | Mok | G01R 35/00 324/762.03 |
| 8,638,113 B2* | 1/2014 | Crafts | G01R 1/07357 324/754.03 |
| 8,734,701 B2* | 5/2014 | Kawakami | G03F 7/0002 264/293 |
| 8,959,980 B2* | 2/2015 | Vodnick | G01P 21/00 73/1.89 |
| 10,043,723 B2* | 8/2018 | Arvin | H01L 22/14 |
| 11,540,398 B2* | 12/2022 | Bower | H01L 23/49811 |
| 11,555,830 B2 | 1/2023 | Daniel | |
| 11,982,650 B2* | 5/2024 | Xu | G01N 19/02 |
| 12,174,078 B2* | 12/2024 | Klank | G01M 5/0083 |
| 2002/0112544 A1* | 8/2002 | Okada | G01L 5/0047 73/716 |
| 2006/0186874 A1* | 8/2006 | Mackin | G01N 3/42 324/754.1 |
| 2007/0132097 A1 | 6/2007 | Wark | |
| 2013/0106453 A1 | 5/2013 | Ikegami | |
| 2016/0084882 A1 | 3/2016 | Dang | |
| 2017/0010315 A1 | 1/2017 | Hironaka | |
| 2022/0340695 A1* | 10/2022 | Rasmussen | G01L 1/2293 |
| 2023/0378120 A1* | 11/2023 | Brewer | H01L 24/75 |
| 2024/0125817 A1* | 4/2024 | Brewer | G01R 31/2891 |

OTHER PUBLICATIONS

From U.S. Appl. No. 17/006,491 (now U.S. Pat. No. 11,555,830), Office Action mailed on Jun. 10, 2022.
From U.S. Appl. No. 17/006,491 (now U.S. Pat. No. 11,555,830), Office Action mailed on Dec. 10, 2021.
PCT International Search Report and Written Opinion from PCT/US2020/048553 dated Dec. 4, 2020.
PCT International Preliminary Report on Patentability (Chapter II) from PCT/US2020/048553 dated May 6, 2021.
Anderson, et al., "Technique for Connecting Electrical Leads to Semiconductors" Journal of Applied Physics 28, 923 (1957), pp. 923-924.
Coucoulas, et al., "Compliant Bonding—A New Technique for Joining Microelectronic Components", IEEE Transactions on Electron Devices, vol. 15, No. 9, Sep. 1968, pp. 664-674.
"Image Reversal Resists and their Processing" (available at https://www.microchemicals.com/technical_information/image_reversal_resists.pdf), viewed Nov. 9, 2020.
"Probe Card" by MJC Micronics Japan Co., Ltd. (available at www.mjc.co.jp/en/products/semiconductor/probe_card.html), printed Nov. 9, 2020.
"Pyramid Probe Cards" by Cascade Microtech (available at www.cascademicrotech.com/files/PYRPROBE_APP.PDF), 2004.
"TPEGTM MEMS T4—Power Your Device" by Technoprobe (available at www.technoprobe.com/soluzione/tpeg-mems-t4-power-your-device), viewed Nov. 9, 2020.
"Vx-MP" by FormFactor (available at www.formfactor.com/product/probe-cards/foundry-logic/vx-mp/), viewed Nov. 9, 2020.

* cited by examiner

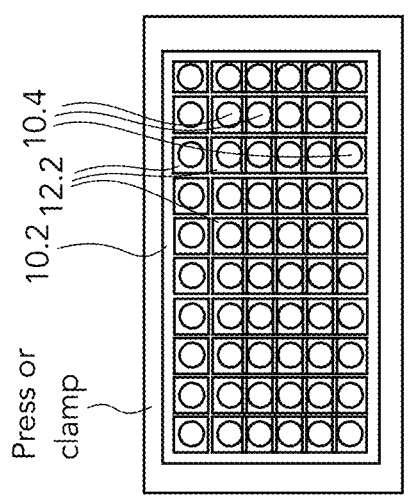

SPIKE ARRAYS FOR SMALL DISPLACEMENT FORCE MEASUREMENT

CROSS REFERENCE TO RELATED APPLICATIONS

This application is related to U.S. Provisional Patent Application Ser. No. 62/893,650 filed 29 Aug. 2019 and entitled "Small Pitch Integrated Knife Edge Temporary Bonding Microstructures" and to its corresponding Non-Provisional patent application Ser. No. 17/006,491 filed 28 Aug. 2020 and also entitled "Small Pitch Integrated Knife Edge Temporary Bonding Microstructures", the disclosures of which are hereby incorporated herein by reference.

STATEMENT REGARDING FEDERALLY SPONSORED RESEARCH OR DEVELOPMENT

None.

TECHNICAL FIELD

Methods and apparatuses for measuring the force generated by an expanding micro-actuator structure whose displacement is in the sub-micron range.

BACKGROUND

Utilizing hydrogen-absorbing metals as actuatable structures is an important technology for a variety of technologies including microelectronic (ex. reversible micro-connectors), morphing microstructures, MEMS devices, and micro-machines since these chemical-based actuators do not require bulky fluidic or electrical connections. In many applications, the actuator is designed for generating a pre-determined force depending on its function (for example, a clamp for connector applications or a linear actuator for de-bonding chips). However, these materials exhibit small displacements when taking up hydrogen and the measurement of those small displacements has been problematical.

Measurement of forces that occur at small displacements, for example, in the sub-micron range, and with high spatial resolution, falls beyond the range of traditional load cell technology whose transducers require a minimum travel to record force changes and lack fine-pitch resolution capability. The specific problem that this invention addresses is the measurement of the force that occur over small displacements, such as those generated by a hydrogen absorbing metal film or micro-bump array that expand in the 1-8% range during the uptake of hydrogen. While the expansion of hydrogen-absorbing pure metals (Pd, Ti, Nb, V, etc.) and alloys thereof have been well characterized by x-ray or in-plane strain measurement in the case of a thin film, the measurement of the out-of-plane force generated by these metals remains unsolved.

Solving this problem can lead to the development of a new class of reversible, chemically-actuated micro-connectors that allow low insertion force and low resistance interconnection of microelectronic components (processors, detectors, RF components) that scale to sub-10 micron dimensions. For example, novel reversible pin and socket micro-connector use lattice expansion induced by hydrogen absorption of pure or bi-metallic sleeve and pin components to actuate the bonding and debonding actions. Finite Element Analysis (FEA) models show that the bimetallic sleeve construction provide large connector extension allowing assembly within the capabilities of current generation die bonders, but the measurement of the force generated by these structures has proved elusive. Several modes of assembly and debonding that enable reversible attachment or permanent bonding would be characterized by the technology disclosed herein.

While large displacement force measurement methods are commercially available using load cells and large displacements (~25 μm), there are no force measurement methods that we are aware of that can work at very small displacements (i.e. sub-micron) and with high spatial resolution (i.e. micron-level pitches) as is taught by this disclosure.

BRIEF DESCRIPTION OF THE INVENTION

This invention is a device and method for measuring the force generated by an expanding micro-actuator structure whose displacement is typically in the sub-micron range. Measurement of forces that occur at small displacements falls beyond the range of traditional load cell technology whose transducers require a minimum travel to record force changes. The force measurement of this invention uses spike arrays (nanometer tipped microstructure constructed of hard materials) together with a softer blank film or patterned array that may be imprinted by the array of spikes. The force may be determined by inverting the nano-indentation problem where the hardness (H) of the material is related to the applied force (F) of the nano-indenter by measuring the imprinted divot area (A) using the equation $H=F/A$. Alternatively, the force may be determined by comparing the imprinted pattern with known, standardized samples.

In this invention, a clamped stack (with a known pre-load) consisting of the hydrogen-absorbing thin film together with the spike array and the imprintable film is assembled and the entire assembly is placed in an appropriate chamber that allows exposure to hydrogen.

After hydrogen exposure, the resulting imprints on the blank film or patterned array surface are characterized by an appropriate technique (AFM, optical microscopy, etc.) to measure the divot area (indented area) and from this data the force can be derived (i.e. $F=H*A$) or comparison to imprinted test films using a calibrated force.

This invention provides a method measuring the force generated by thin films or microstructures in response to environmental factors (such as the presence of hydrogen) without resorting to macroscopic scale-ups. This invention provides a solution for measuring forces generated by sub-micron displacements enabling characterization the out-of-plane force generated by micro-actuator structures. The direct measurement of the applied force enabled by this invention also allows probing of complicating affects due to substrate clamping that often hamper the actuator expansion but are difficult to quantify because of the small displacements involved.

In one aspect the present invention provides an apparatus comprising a clamped stack of a gas (such as hydrogen) absorbing actuator or sensor together with an array of spikes or spike-like structures and a film or layer, the spikes or spike-like structures having pointed ends assembled to engage the film or layer, the pointed ends of the spikes or spike-like structures having a hardness is greater than a hardness of the film or layer whereby the actuator in the presence of said gas causes the pointed ends of the spikes or spike-like structure to form impressions or divots in the film or layer.

The gas absorbing actuator can comprise a continuous thin film layer or comprise a patterned (segmented) layer with the segmented layer consisting of an array of isolated pads. Segmenting of the actuator should help preventing in-plane stress from building up that causes unwanted bending (bowing) of the actuator/substrate tile and/or cracking of the actuator layer.

BRIEF DESCRIPTION OF THE DRAWINGS

FIGS. 3a-3d depict alternative embodiments of an apparatus for measuring the force generated by a thin expanding film or array of microstructures using a pressure measurement test kit

DETAILED DESCRIPTION

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to (i) all papers and documents which are filed concurrently with this specification and which are open to public inspection with this specification (the contents of all such papers and documents are incorporated herein by reference) and (ii) all papers and documents which are otherwise incorporated by reference herein (but not physically filed with this specification).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

This invention provides a method and device apparatus for measuring the force generated by an expanding thin film or array of microstructures that acts over small displacements. The material used for the thin film or microstructure array comprises of a pure metal (such as Pd, V, Nb, Ti, Ni, etc.) or alloy or other material that absorbs hydrogen with a resulting volumetric and linear expansion. The linear expansion of these metals or alloys is typically in the 0-8% range and the films or microstructure have a height dimension of <10 μm for displacements in the nm to sub-micron range of the thin film material.

Figure 1:
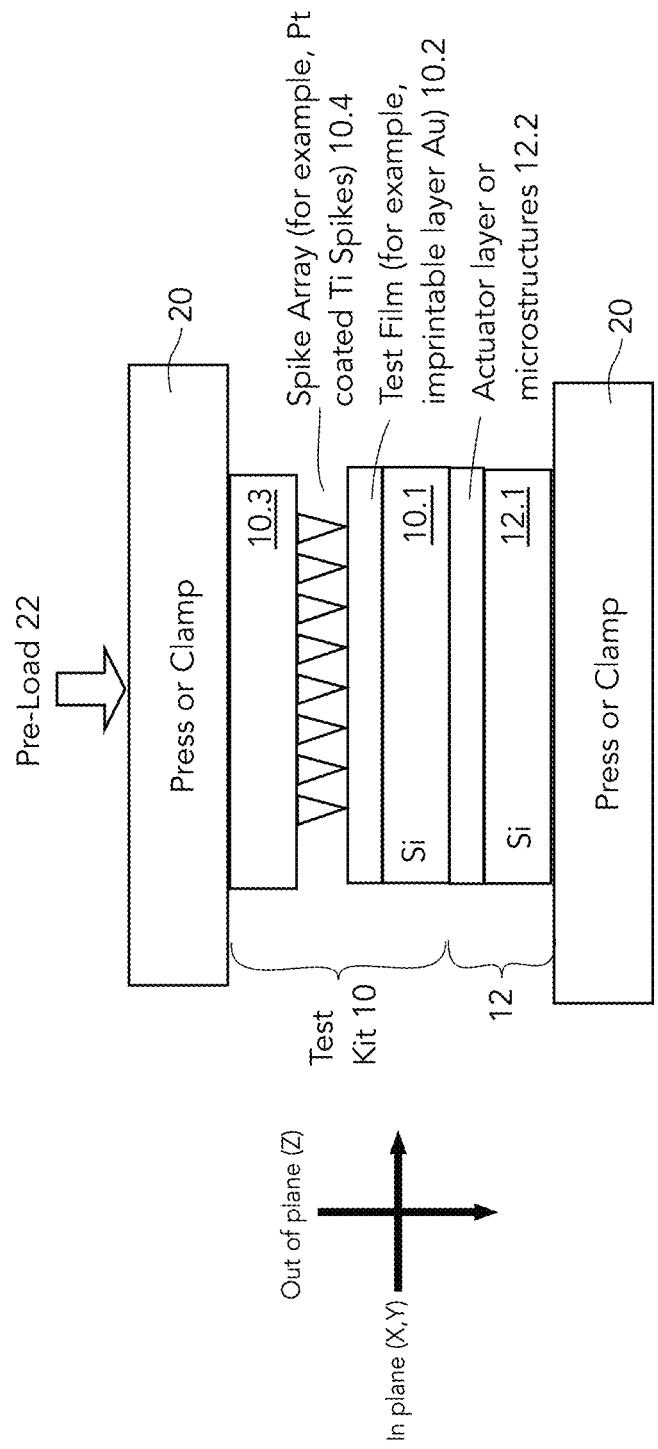
FIG. 1 is a schematic illustration of one embodiment of an apparatus for measuring the force generated by a thin expanding film or array of microstructures using a pressure measurement test kit. The test kit uses a first substrate with a test film that is imprintable by spike arrays on a second substrate.
Figure 2:
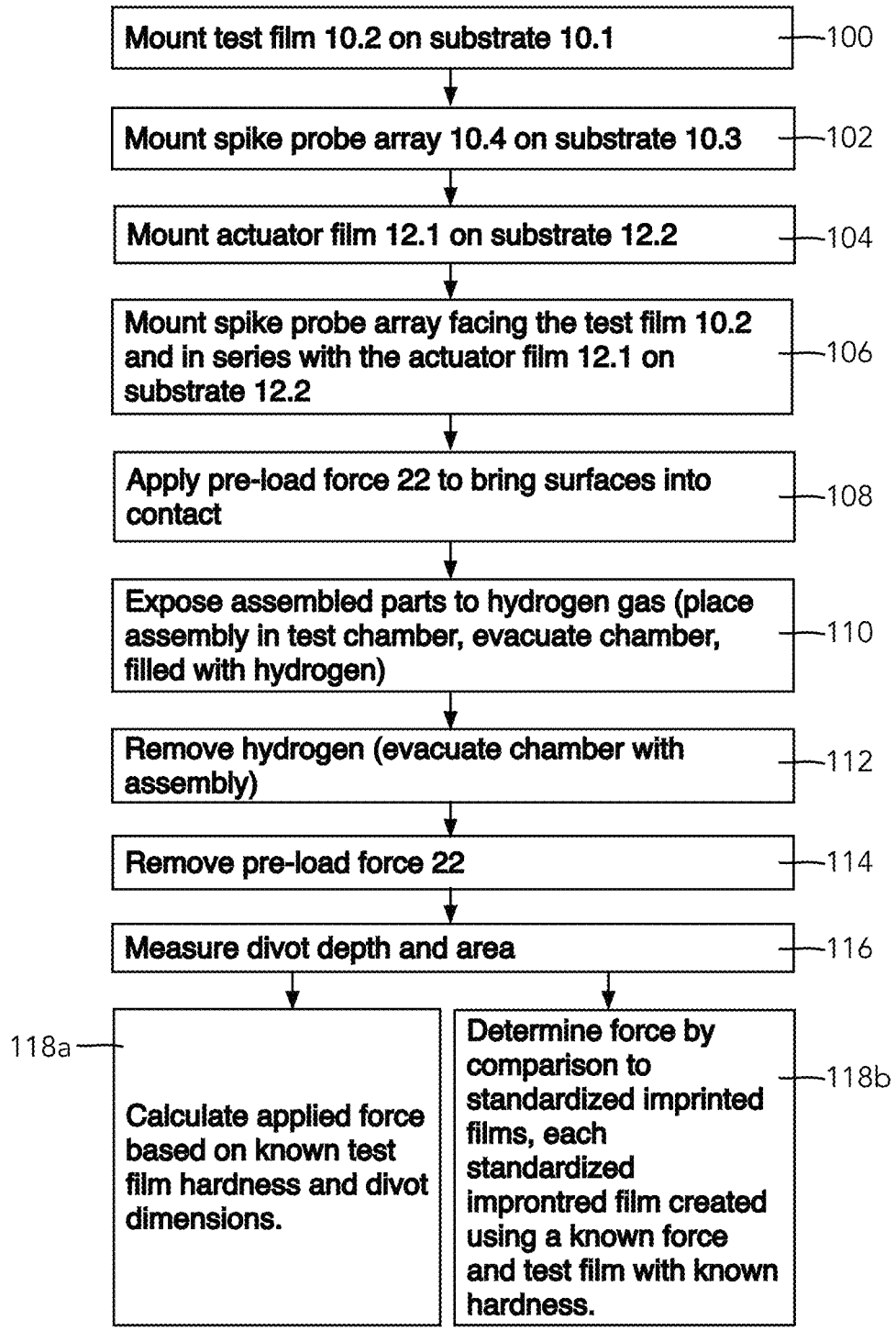
FIG. 2 is a flow chart of the imprinting process which involves nano-indentation that only requires sub-micron displacements in order to record a pressure map.

One embodiment of an apparatus for performing the measurement, shown in FIG. 1, includes a pressure measurement test kit 10 that is mechanically arranged in series with the thin film/microstructure array actuator 12.1 that are both clamped in a static press 20 with a known pre-load force 22. FIG. 2 is an flow chart of the imprinting process which involves nano-indentation that only requires sub-micron displacements in order to record a pressure map. The pressure measurement kit consists of a first substrate 10.1 with a first surface with a test film 10.2 (i.e. a mechanically soft, imprintable film) and a second substrate 10.3 with an array 10.4 of spike structures with a uniform density and/or constant pitch made with materials harder than the test film 10.2.

The measurement method comprises assembling the test kit 10 with the test film or layer 10.2 disposed on a substrate 10.1 (see step 100) and a spike array mounted disposed on a substrate 10.3 (see step 102). The actuator film or layer is preferably mounted a substrate 12.2 (see step 104). The spiked ends of the spike array confront the test film 10.2 and the resulting test kit 10 is disposed in series with a hydrogen-absorbing, expanding, metal film or microstructure array 12.1 (preferably mounted on substrate 12.2) under test (see step 106).

The resulting stack of the test kit 10 and expanding film 12 are then pre-loaded with an initial, pre-load force 22 (see step 108), in a static press (clamp) 20, the pre-load force known to maintain physical contact between the components but which is preferably below the detection limit of the test kit 10. As such, the pre-load force 22 is preferably pre-selected not to cause significant (measurable, for example) imprints on the test film 10.2.

The stack then is exposed to hydrogen that causes the hydrogen-absorbing metal film or microstructure array 12 to expand (see step 110). The resulting expansion is used to drive the spike array 10.4 of the second substrate 10.3 into the softer test film 10.2 on the first substrate 10.1 causing imprints to form on the surface of the test film 10.2. After exposure to hydrogen the assembled components are removed from the hydrogen environment (see step 112) and disassembled (see step 114) to observe the imprint pattern in the test film 10.2.

The test film 10.2 may be formed of materials having a lower Young's modulus that the material used to form the spikes 10.4. The spikes 10.4 are fabricated with high hardness material such as Ti (with a Young's Modulus of about 120 GPa), Pt (with a Young's Modulus of about 168 GPa), W (with a Young's Modulus of about 340 GPa), including alloys thereof, or other high Young's Modulus material that allow the metal test films 10.2 having a relatively lower Young's Modulus to be indented thereby, the test films 10.2 possibly comprising Au (with a Young's Modulus of about 78 GPa), Al (with a Young's Modulus of about 68 GPa), In (with a Young's Modulus of about 10 GPa) Cu (with a Young's Modulus of about 130 GPa) or alloys thereof or other material having a relatively lower Young's Modulus.

Each of spike structures in an array 10.4 is preferably of a uniform size and shape, and, in cross-section, the shape may be of any convenient geometric shape, including a circular shape. The spike structures form impressions (divots) in the softer test film 10.2 when the hydrogen-absorbing metal film or microstructure array 12.1 expands as a result of being exposed to hydrogen.

For Pd films utilized as element 12.1 the response to hydrogen is within a few seconds from the time of exposure. It is very desirable that the metal film 12.1 not have an oxide as coating or layer it would block (prevent or inhibit) the hydrogen from entering the underlying film. If other metals than Pd are used for element 12.1, then a thin Pd overcoat is preferably applied to such other metals (for example, Nb, V, Ti) that form oxides. The Pd in such embodiments serves as a gateway for the hydrogen to enter element 12.1 quickly. The needed hydrogen overpressure required for hydrogen to fully form the final M-Hx composition depends on the metal utilized. See "Phase diagrams of binary hydrogen alloys" F. D. Manchester Ed., ASM International, Materials Park, OH (2000), the disclosure of which is hereby incorporated herein by reference. For Pd, the response time is a few seconds as mentioned above with a pressure of about one atmosphere.

The divots of the imprint pattern in the test film 10.2 are measured and characterized in terms of diameter (or width) and depth (see step 116).

The imprinting process involving nano-indentation only requires sub-micron displacements to record a pressure map. From the area (A) of the imprinted divots and the known test film material hardness (H), a force can be derived by the equation (F=H*A) according to step 118a.

Alternatively, the collected measurements may be compared with standard samples generated using calibrated forces as represented by step 118b.

Steps 118a and 118b may be both used as a check of one against the other to help ensure that the force generated by element 12.1 has been correctly determined.

The spike array 10.4 on the second substrate 10.3 is preferably configured with a pre-selected density to match the anticipated force generation regime of the hydrogen-absorbing metal film 12.

The intended application of this invention is to measure the force generated by thin-films or micro-actuator structures 12.1 consisting of metal or metal alloys that absorb hydrogen. It is well known in the art that many metals absorb hydrogen and that the ensuing linear lattice expansion is in the 0-8% range. The in-plane expansion of these materials can be measured using X-ray techniques and the in-plane force generated is determined by the stress measured on neighboring films or substrates by mechanical deformation (wafer bow) or by surface-science techniques (X-ray, neutron diffraction). The out-of-plane force generated by this phenomime however is difficult to measure except for macroscopic sized samples. The typical dimensions of thin-films or microstructure measurable by this invention is in the micron-size range. The resulting displacements are thus in the nm to sub-micron range. This level of displacement is below the force detection limit of available load cells. For example, most load cells require a minimum travel of ~25 µm to register a force. This would require a thick sample of Pd ~830 µm to record forces at its detection limit.

The thin-films or micro-actuator structures 12.1 are preferably mounted on a substrate 12.2 (such as silicon and preferably having a thickness of about 600 µm) to provide support for same. Likewise, the test and spike layers are also preferably mounted on substrates 10.3 and 10.1 (preferably also formed of as silicon and preferably each having a thickness of about 600 µm) also for support.

The actuator layer 12.2 is thin (having a thickness preferably in the range of 1-2 µm, formed of a hydrogen absorbing material such as Pd, V, Nb, Ni, Ti) preferably by deposition on silicon substrate 12.1.

Figure 3A:
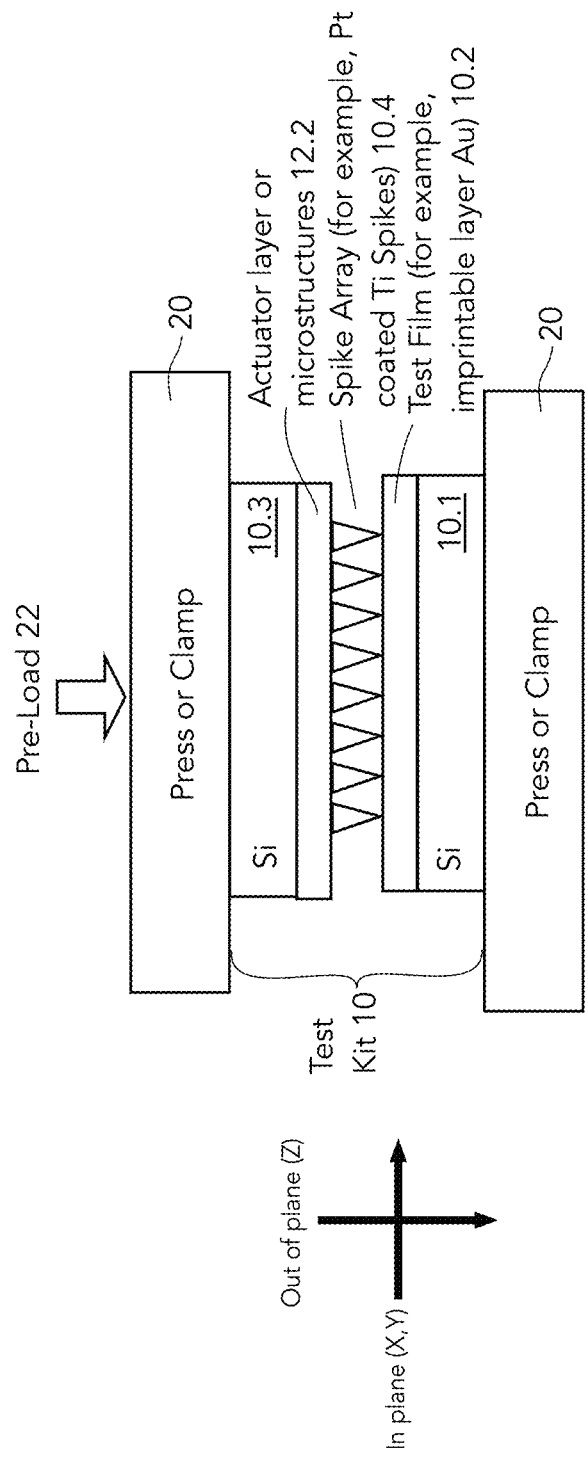
Figure 3B:
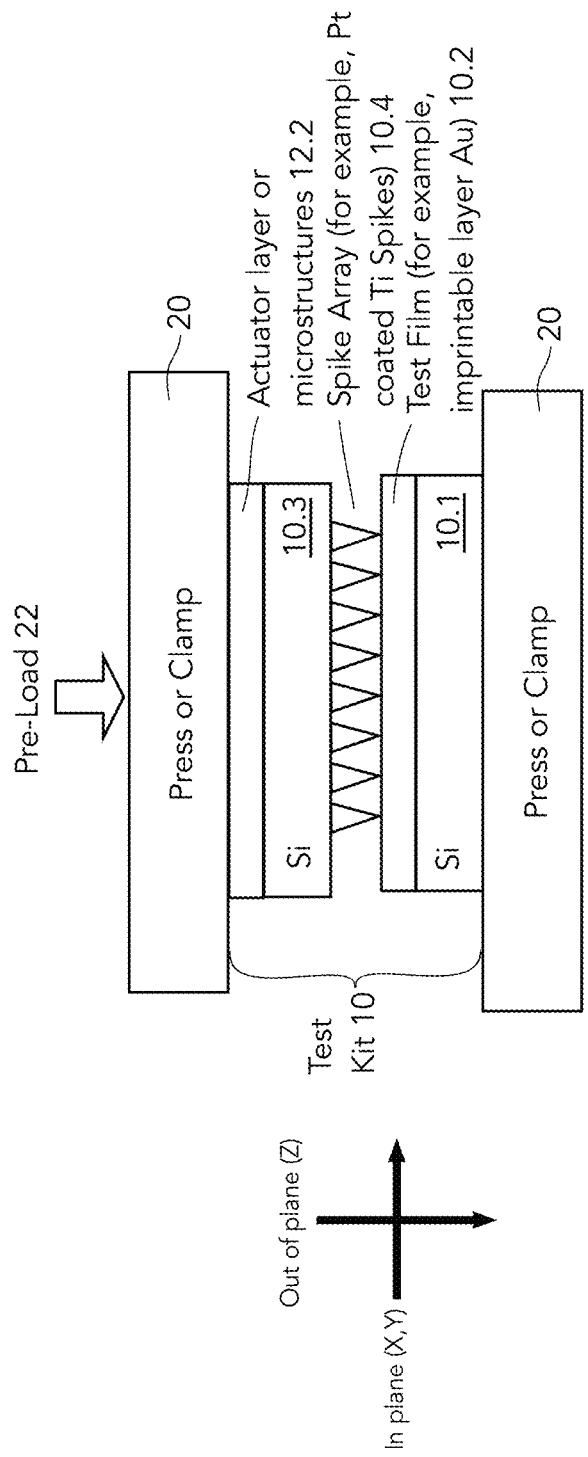

The actuator 12.2 shown in FIGS. 1, 3a and 3b may comprise a thin hydrogen absorbing (upper) metal layer on substrate 10.3 that is positioned in the load path of the spike array test kit 10 (see FIG. 1). This configuration provides a direct measurement of the out of plane displacement of the actuator layer. The actuator can comprise a continuous thin film (see FIGS. 3a and 3b) or be patterned with the layer consisting of a uniform array of isolated pads (see FIGS. 3c and 3d) disposed on the substrate 10.3. The segmenting of the layer 10.3 of the actuator 12.1 prevents in-plane stress from building up that can cause unwanted bending (bowing) of the actuator/substrate tile and/or cracking of the actuator layer.

Figure 3C:
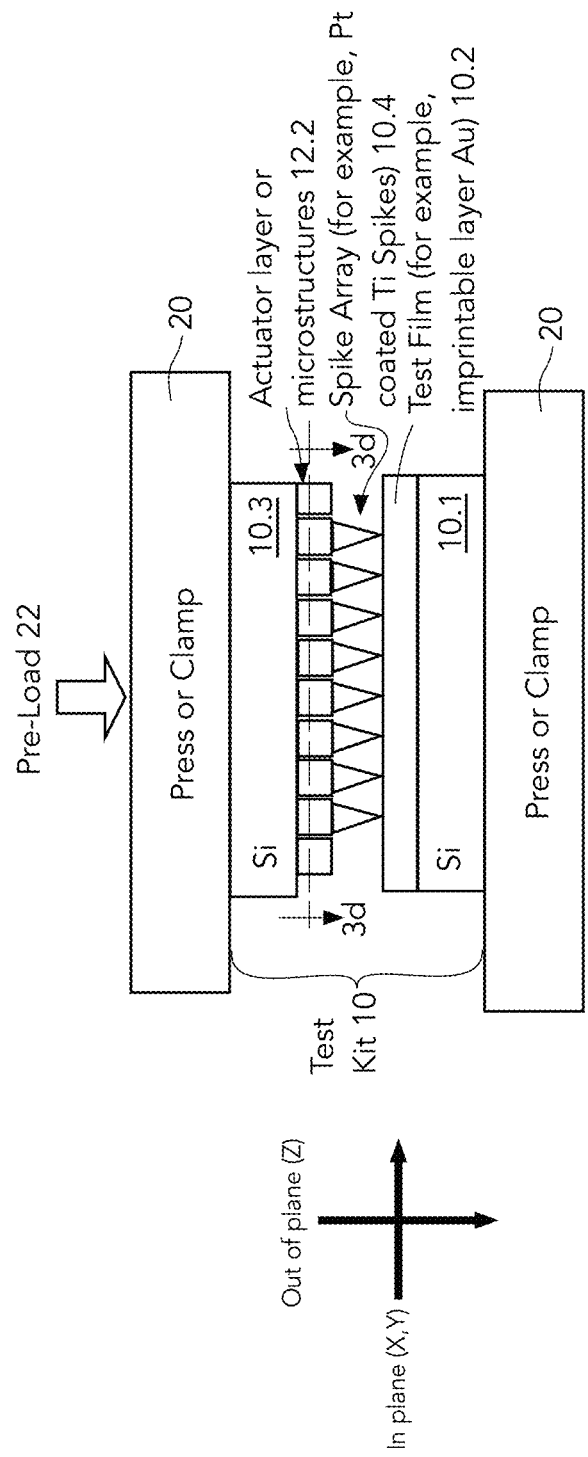

The segmentation of the actuator layer 10.3 of the actuator 12.1 may be applied to the embodiment of FIG. 3a (as is shown by the embodiment of FIG. 3c) or alternatively to the embodiments of FIGS. 1 and/or 3b. FIG. 3d depicts a cross-sectional view along line 3d-3d of FIG. 3c showing that the array of spikes 10.4 is preferably a 2D array. The spikes 10.4 of the other embodiments may also comprise a 2D array.

The spike layer 10.4 is preferably formed as described in U.S. Provisional Patent Application Ser. No. 62/893,650 filed 29 Aug. 2019 and entitled "Small Pitch Integrated Knife Edge Temporary Bonding Microstructures" and to its corresponding Non-Provisional patent application Ser. No. 17/006,491 filed 28 Aug. 2020 and also entitled "Small Pitch Integrated Knife Edge Temporary Bonding Microstructures". The individual spikes in the spike layer 10.4 may be conically shaped in cross-section and have a height in the range of 1 to 10 µm disposed on a fine pitch (pitches as small as 2.5 µm are possible).

The fabrication of the spike arrays 10.4 preferably utilize a self-limiting deposition process as taught by the aforementioned patent applications that provides the following advantages: (1) fine-pitch arrays of conically shaped spike structures (with heights ranging from 1 µm to 6 µm), (2) the ability to fabricate spikes with a variety of different metals with high hardness (demonstrated Ti, Pt, Pd, and W), (3) conically-shaped spikes (see FIG. 3d) with well-defined taper angles (Ti ~65°, Pd ~85°, Au ~78°), (4) spike arrays with low tip height variation (demonstrated <10 nm, the spike heights are made with a self-limiting process that enables high fidelity replication), (5) ultra-sharp tips (demonstrate in the ~10 nm dimensions), and (6) the ability to engineer surface properties by overlaying the spike structure with other metals (i.e., Ti spikes with Pt over-layers) may be utilized to improve release after indentation and prevent metallurgical bonds to form (natural oxides help to prevent metallurgical bonds to indented material layers or bumps).

For small dimension microstructures, substrate clamping effects can alter the expansion of the metal films and its resulting generated force. The present disclosure provides a direct measurement of the out of plane force generated by expanding thin films or microstructure arrays by measuring the imprint dimensions of the spike array into the test film. This method is related to nano-indentation methods that measure the hardness of a material (H) by measuring the imprint divot area (A) using a known force (F) using the expression H=F/A, but instead of a single indenter, an array (preferably a two-dimensional array) of spike indenters 10.4 is employed. By inverting the nano-indentation problem using a test film with a known hardness (H), the applied force (F) can be determined by the following expression F=H*A.

The step of measuring a size or dimension of said impressions may be performed by an appropriate technique such as atomic force microscopy, optical microscopy, etc. to measure the impression area and from this measurement the force can be derived (i.e. F=H*A) or a comparison is made to imprinted test films made using calibrated forces.

This disclosure teaches using the expanding hydrogen-absorbing film to generate the force used to drive the spike array into the test film but other force providing films or materials may possibly be used instead. This measurement making ability is important to harnessing the use of and characterizing the capability of micro-actuators.

The embodiment of FIG. 1 envisions that the test kit 10 and the thin metal film/microstructure array actuator 12.1 disposed on substrate 12.2 are separate entities, but the thin metal film/microstructure array actuator 12.1 may instead be integrated with the test kit, as is depicted by the embodiments of FIGS. 3a and 3b, thereby eliminating a possible need for substrate 12.2. Doubtlessly, those skilled in the art will envision other ways of sandwiching the test film 10.2, the array of spikes 10.4 and the thin metal film/microstructure array actuator 12.1 to measure the force developed by the he thin metal film/microstructure array actuator 12.1 in response to exposure to hydrogen.

Also, in embodiments of this disclosure, the change in thickness of (or force supplied by) an actuator is in response to the presence of hydrogen being measured, but it should be now apparent that the disclosed apparatus and method may be used to measure a change in thickness of (or force supplied by) a dimensionally variable material in response to some other environmental factor than presence of hydrogen.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary or preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Section 112, as it exists on the date of filing hereof, unless the element is expressly recited using the phrase "means for . . . " and no method or process step herein is to be construed under those provisions unless the step, or steps, are expressly recited using the phrase "comprising the step(s) of . . . ."

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

What is claimed is:

1. An apparatus for measuring a force generated by an expanding micro-actuator structure, the apparatus comprising an array of spike-like structures and a layer, the spike-like structures having pointed ends assembled to engage the layer, the pointed ends of the spike-like structures having a hardness greater than a hardness of the layer; and the expanding micro-actuator structure arranged to expand in a presence of a gas, wherein said expansion pushes the spike-like structures toward the layer and causes the pointed ends of the spike-like structure to form impressions in the layer.

2. The apparatus of claim 1 wherein the gas is essentially comprised of hydrogen.

3. The apparatus of claim 1 wherein the layer comprises gold or material having a hardness less than that of gold.

4. The apparatus of claim 3 wherein the layer is disposed on a substrate of a material having a hardness greater than that of gold.

5. The apparatus of claim 4 wherein the pointed ends of the array of spike-like structures comprise a material selected from the group consisting of Ti and Pd and alloys, mixtures and/or layers thereof.

6. The apparatus of claim 1 wherein the expanding micro-actuator structure comprises a thin film or microstructure array of material that absorbs said gas.

7. The apparatus of claim 1 in combination with a chamber, wherein the expanding micro-actuator structure, the array of spike-like structures and the layer form a clamped stack; wherein the chamber is sized to receive the clamped stack and said gas, wherein the clamped stack is disposed in said chamber and exposed to said gas within said chamber.

8. The apparatus of claim 1 wherein the expanding micro-actuator structure is segmented into individual spaced-apart pads or individual spaced-apart elements.

9. The apparatus of claim 8 wherein individual spaced-apart pads or elements comprise a two-dimensional array of individual spaced-apart pads and wherein the array of spike-like structures also comprises a two dimensional array, and wherein each spike-like structure has a separate individual spaced-apart pad disposed therewith.

10. A method of measuring a force developed by a gas absorbing micro-actuator structure in response to a presence of an environmental factor, the method comprising:
 disposing a gas absorbing micro-actuator structure together with an array of spike-like structures and a layer in a chamber, the spike-like structures having pointed ends assembled to engage the layer, such that an expansion of said gas absorbing micro-actuator structure pushes the spike-like structures toward the layer and causes the pointed ends of the spike-like structure to form impressions in the laver; the pointed ends of the spike-like structures having a hardness that is greater than a hardness of the layer;

exposing the gas absorbing micro-actuator structure to said environmental factor in said chamber, such that the gas absorbing micro-actuator structure expands in the presence of said environmental factor thereby causing said impressions to occur in said layer, and measuring a size or dimension of said impressions to calculate said force and/or comparing a size or dimension of said impressions against known imprinted test layers to determine said force.

11. The method of claim 10 wherein the gas absorbing micro-actuator structure, the array of spike-like structures and the layer form a clamped stack; and wherein after exposure to said environmental factor, the clamped stack is removed from the chamber and disassembled and wherein the step of measuring a size or dimension of said impressions is performed by an appropriate technique to measure an impression area and from this measurement the force can be derived or a comparison is made to imprinted test films made using calibrated forces.

12. The method of claim 10 wherein the gas is essentially comprised of hydrogen.

13. The method of claim 10 wherein the layer comprises gold or a material having a hardness less than that of gold.

14. The method of claim 13 wherein the layer is disposed on a substrate of a material having a hardness greater than that of gold.

15. The method of claim 14 wherein the pointed ends of the array of spike-like structures comprise a material selected from the group consisting of Ti and Pd and alloys, mixtures and/or layers thereof.

16. The method of claim 10 wherein the gas absorbing micro-actuator structure comprises a thin film or microstructure array of material that absorbs said gas.

17. The apparatus of claim 1 wherein the spike-like structures are spikes.

18. The apparatus of claim 1 wherein the layer is a film.

19. The method of claim 10 wherein the spike-like structures are spikes.

20. The method of claim 10 wherein the layer is a film.

* * * * *